United States Patent

[11] 3,622,857

[72] Inventor  Indar K. Sethi
               Inglewood, Calif.
[21] Appl. No. 7,014
[22] Filed     Jan. 30, 1970
[45] Patented  Nov. 23, 1971
[73] Assignee  McCulloch Corporation
               Los Angeles, Calif.

[54] CONTROL CIRCUITRY FOR TERMINATION OF RAPID BATTERY CHARGING
6 Claims, 1 Drawing Fig.

[52] U.S. Cl. .................................................. 320/14,
                                                320/22, 320/40
[51] Int. Cl. ............................................... H02j 7/10
[50] Field of Search........................................ 320/5, 10,
          14, 20, 22–24, 30, 31, 37–40, 53, 50, DIG. 2;
                                                       323/115

[56]                References Cited
                  UNITED STATES PATENTS
3,363,162   1/1968   Bawden........................ 320/TD
3,517,293   6/1970   Burkett et al................   320/14

*Primary Examiner*—J. D. Miller
*Assistant Examiner*—John M. Gunther
*Attorney*—Christie, Parker and Hale ABSTRACT: A battery is charged in a very short period of time, for example less than fifteen minutes, by alternately applying charging current pulses during a charge interval and applying a discharge path during a discharge interval as the charge on the battery progresses. The discharge path is applied in response to a signal that is an integral function preferably of the battery terminal voltage. Means are provided in the rapid battery charging circuitry for precluding the application of the discharge path while charge current pulses are being applied to the battery. The rapid charging of the battery is terminated with the possibility of the application of a trickle charge thereafter by circuitry that is responsive to a predetermined battery terminal voltage. The rapid battery charging circuitry also includes means for making the rapid charge terminating circuitry sensitive only to the battery terminal voltage while there are no charge current pulses being applied to the battery.

PATENTED NOV 23 1971 3,622,857
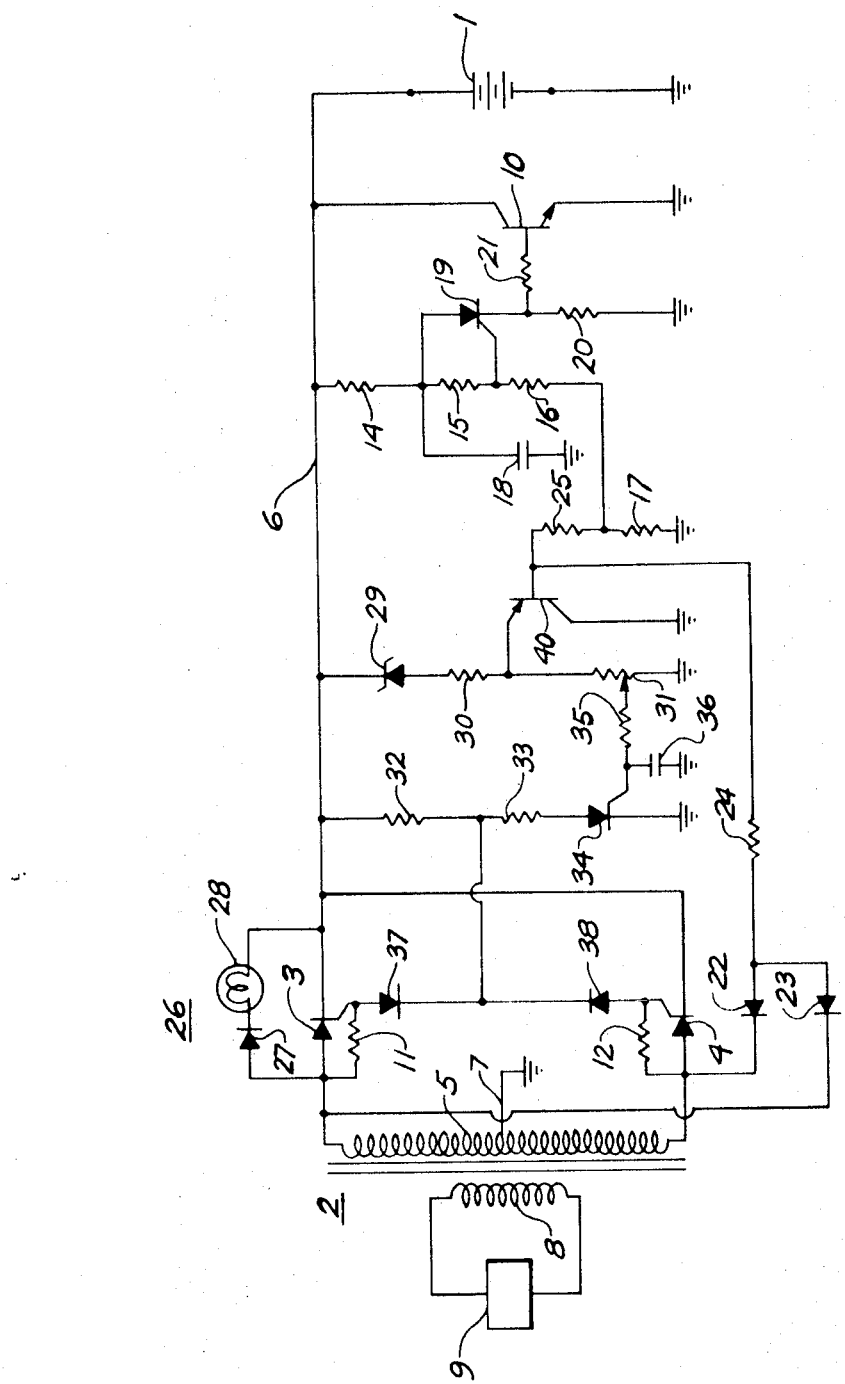
INVENTOR.
INDAR K. SETHI
BY
Christie, Parker & Hale
ATTORNEYS

CONTROL CIRCUITRY FOR TERMINATION OF RAPID BATTERY CHARGING

CROSS-REFERENCES TO RELATED APPLICATIONS

The invention of this application is related to those disclosed and claimed in the copending U.S. applications Ser. No. 612,995, filed Jan. 31, 1967, now Pat. No. 3,517,293; Ser. No. 726,060, filed May 2, 1968; Ser. No. 836,791, filed June 26, 1969; Ser. No. 867,838, filed Oct. 20, 1969; Ser. No. 870,402, filed Oct. 20, 1969, and assigned to the same assignee as the present application. (This application is not a continuation or a continuation-in-part of any of these referenced applications.)

BACKGROUND OF THE INVENTION

Field of the Invention

This invention relates to circuits for rapid charging batteries, and particularly for rapid charging batteries of different internal impedances without direct compensation for the differing impedances.

SUMMARY OF THE INVENTION

The charging of batteries to rated capacity in less than 30 minutes, even though the battery manufacturers recommend a longer time, for example 16 hours, may now be accomplished by employing the method and circuitry disclosed in the above-referred to applications.

In the charging of batteries it is desirable that the efficient operation of the rapid charge circuitry not be limited to use with batteries having a particular internal impedance. The usefulness of a single battery charger may be enhanced if the circuitry of the charger is not designed for one particular battery impedance. The circuitry of the rapid charger of the present invention may be employed for the charging of batteries manufactured by different companies. Batteries of comparable rated capacity from different manufacturers may have different internal characteristics including widely differing impedances.

In accordance with the present invention the circuitry for rapid charging a battery comprised of one or more cells includes transmission means operable to transmit direct-current pulses to the battery through a continuously operable electrical connection. The direct-current pulses may advantageously be supplied by rectification of the output of an alternating-current source. The rectifiers may be silicon-controlled rectifiers connected to opposite ends of a secondary of a transformer which may be employed for isolation and to provide the proper voltage for charging multicelled batteries.

The circuitry further includes a discharge path and a discharge means for periodically electrically applying the discharge path across the battery without interrupting the electrical connection between the battery and the transmission means. The discharge means includes a first signal-developing means operable in response to a battery function. This first signal-developing means may advantageously be comprised of an integrating circuit for integrating the battery terminal voltage and a silicon-controlled rectifier operable in response to the voltage across the integrating circuit for applying a control signal to apply the discharge path.

The discharge means further includes a second signal-developing means operable at least during the transmission of direct-current pulses to the battery with the second signal-developing means cooperating with the first signal-developing means to provide a control signal to electrically apply the discharge path across the battery. The second signal-developing means may advantageously include a second pair of rectifiers connected to the opposite ends of the secondary of the transformer for providing a rectified voltage of opposite polarity and of the same phase as the direct-current voltage pulses provided for charging the battery. The output of the second rectification circuitry is coupled to the integrating circuit so that the discharge path will not be applied while charge current is flowing.

The rapid battery charging circuit may further include means operable in response to the attainment of a predetermined battery terminal voltage for reducing the current applied to the battery. The means for reducing the current may advantageously include a path in parallel with at least one of the silicon-controlled rectifiers in the rectifying circuit for providing trickle charge current to the battery, means for sensing the battery terminal voltage, means responsive to the sensing means for inhibiting the operation of the silicon-controlled rectifiers in the rectifying circuit in response to the attainment of a predetermined battery terminal voltage, and means for rendering the inhibiting means inoperative while charge current is flowing.

BRIEF DESCRIPTION OF THE DRAWING

The above and other features and advantages of the present invention may be understood more clearly and fully upon consideration of the following specification and the single FIGURE of the attached drawing in which:

A schematic diagram of a rapid charging battery charging circuit in accordance with the present invention is shown.

DESCRIPTION OF THE PREFERRED EMBODIMENTS

The preferred embodiment of the circuit for rapid charging a battery by alternately applying charge current pulses during a charge interval and applying a discharge path during a discharge interval to progressively charge a battery is shown schematically in the single FIGURE of the drawing.

The circuitry includes transmission means operable to transmit direct-current pulses to a battery 1 through a continuously operable electrical connection. The transmission means includes a transformer 2, a pair of silicon-controlled rectifiers 3 and 4 connected to opposite ends of the secondary 5 of the transformer 2, a conductor 6 connected between the common cathodes of the rectifiers 3 and 4 and the positive terminal of the battery 1, and the common ground connection at the negative terminal of battery 1 and the center tap 7 of the secondary 5 of transformer 2.

A resistor 11 is connected between the anode and gate of the silicon-controlled rectifier 3 and a resistor 12 is connected between the anode and gate of silicon-controlled rectifier 4 to provide paths for the current through the gate-cathode junction of the silicon-controlled rectifiers to turn them on when the voltage across the secondary 5 of the transformer 2 exceeds the terminal voltage of the battery so that the rectifiers are forward-biased.

The output voltage at the common junction of the cathodes of the silicon-controlled rectifiers 3 and 4 is a fullwave rectified voltage which provides direct-current pulses to the battery 1. These pulses may be alternatively supplied by a half-wave rectifier with only one silicon-controlled rectifier or may be supplied by a fullwave rectifier with two diodes in front of a single silicon-controlled rectifier. The primary 8 of the transformer 2 is connected to a source 9 of alternating-current voltage, which source may be the commercial 110-volt alternating-current voltage.

A discharge path comprising a power transistor 10, as an active element, is connected across the battery 1. In cooperation with the transistor 10 discharge path is a discharge means for periodically electrically applying the discharge path across the battery 1 without interrupting the electrical connection between the battery 1 and the source of direct-current pulses comprised of the alternating-current source 9, transformer 2, and silicon-controlled rectifiers 3 and 4. The discharge means for applying the discharge path includes a voltage divider network of series-connected resistors 14, 15, 16, and 17 connected between the positive terminal of battery 1 and ground reference.

A capacitor 18 is connected between the junction of resistors 14 and 15 and ground reference. A silicon-controlled rectifier 19 is also connected to the junction of resistors 14 and 15 and to ground reference through a resistor 20. Resistor 20 is connected between the cathode of silicon-controlled rectifier 19 and ground reference with the anode of the silicon-controlled rectifier 19 being connected to the junction of the resistors 14 and 15. The gate of silicon-controlled rectifier 19 is connected to the junction of resistors 15 and 16. A resistor 21 connects the cathode of the silicon-controlled rectifier 19 to the base of transistor 10.

The integrating circuit of resistors 14, 15, 16, and 17 and capacitor 18 cooperate to produce a signal-developing means operable in response to a battery function. In particular, the elements cooperate to develop a first signal as an integral function of the battery terminal voltage, which terminal voltage increases as the charging of the battery progresses.

The discharge means for applying the discharge path further includes a means for developing a second signal or a source means for supplying a second signal that opposes the signal applied between the gate and cathode of silicon-controlled rectifier 19 through the action of the capacitor 18 and a series combination of resistors 14 through 17. The second signal-developing means or source means for supplying a second signal includes a pair of diodes 22 and 23 having their cathodes connected to opposite ends of the secondary 5 in a fullwave rectifier configuration. The anodes of the diodes 22 and 23 are connected together and to ground reference through a series combination of a resistor 24, a resistor 25 and resistor 17.

The discharge means for applying the discharge path operates independently of the battery internal impedance, except as this impedance affects the battery terminal voltage. More particularly, the circuit means for preventing the application of the discharge path while charge current is flowing operates independently of the battery internal impedance so that batteries of different manufacturers that may have different internal characteristics may be charged without changing the charge circuitry to compensate for these different characteristics.

The rapid charging circuitry of the drawing also includes a path 26 in parallel with silicon-controlled rectifier 3 for providing trickle charge current to the battery 1 after termination of the rapid charging of the battery.

The parallel path includes a series-connected diode 27 and an indicator lamp 28. A similar path could also be connected in parallel with silicon-controlled rectifier 4 if increased trickle charge is desired.

The circuitry of the charger shown in the drawing further includes a means for terminating the rapid charging of the battery by inhibiting the operation of the silicon-controlled rectifiers 3 and 4 which inhibiting circuit includes a series-connected Zener diode 29, resistor 30, and potentiometer 31, which series combination is connected between the positive terminal of battery 1 and ground reference. The inhibiting circuitry further includes the series combination of a resistor 32, a resistor 33, and a silicon-controlled rectifier 34 which combination is also connected between the positive terminal of battery 1 and ground reference. The gate of silicon-controlled rectifier 34 is connected through a resistor 35 to the movable arm of potentiometer 31. The gate of silicon-controlled rectifier 34 is also connected to ground reference through a capacitor 36. A diode 37 is connected between the gate of silicon-controlled rectifier 3 and the junction of resistors 32 and 33, and a diode 38 is connected between the gate of silicon-controlled rectifier 34 and the junction of resistors 32 and 33.

The circuitry further includes a means for making the rapid charging termination means responsive to the quiescent battery terminal voltage, i.e., the battery terminal voltage when no charging current is flowing, which includes a PNP-transistor 40 connected between the junction of resistor 30 and potentiometer 31 and ground reference, and the bias provided by the rectification circuit of diodes 22 and 23 and resistors 24, 25, and 17.

For purposes of illustration, it will be assumed that a battery 1 comprised of five sub C sealed nickel-cadmium cells is to be charged. However, it is to be understood that this invention is not limited to charging sealed nickel-cadmium cells nor batteries of exactly five cells. It is applicable to the charging of any rechargeable electrochemical power source.

For the illustrative example, it is assumed that the sub C nickel-cadmium cell is the one used in battery 41 B001KD06 manufactured by the General Electric Company, which has a nominal voltage of 1.2 volts per cell and a nominal capacity of 1 ampere-hour when discharged at a rate of 100 milliamperes over a 10-hour period to a selected end voltage. The manufacturer recommends that this cell be charged at 100 milliamperes for a period of 16 hours. This time is excessive as this cell can be charged in considerably less time with negligible increase in temperature by employing the method of the present invention.

For the purposes of this application, C will be the amperage of the current at which a cell has been discharged in rating the cell to a selected end voltage in a selected period of time, which is generally 1 hour or 10 hours. For example, the above cell has a C rate of one ampere whereby a selected end voltage is reached in 1 hour.

In operation the battery 1 to be charged is attached to the charging circuit as shown in the single FIGURE of the drawing and voltage is applied to the charger from the alternating-current source 9. It does not matter which operation takes place first because the charger circuitry of the present invention will not prematurely shut off but will bring up the charge on the battery rapidly. If the source is applied before the battery is attached, the transistor 40 will function to prevent premature termination of rapid charge and if the battery is attached first, the battery terminal voltage will not be sufficient to cause the rapid charge termination circuit to operate. If the voltage is positive at the top terminal of the secondary 5 and is greater than the terminal voltage of battery 1, current will begin to flow through resistor 11 and the gate-cathode junction of silicon-controlled rectifier 3, thereby gating "on" this silicon-controlled rectifier 3. Thereafter, charging current, preferably having a peak value of approximately five times C of the battery being charged is applied to charge the battery 1. When the bottom terminal of the secondary 5 has a positive voltage that is greater than the terminal voltage of the battery, the silicon-controlled rectifier 4 will conduct to provide the charging current to the battery.

With the application of charging current the terminal voltage of the battery increases, which terminal voltage appears across the voltage divider of resistors 14, 15, 16, and 17. A portion of the battery terminal voltage will appear across capacitor 18 which will attempt to charge to the voltage level of the portion appearing across the capacitor 18. During the time the charging current pulses are applied to the battery 1 either diode 22 or 23 is conducting so that a signal is developed across resistor 17 that is negative with respect to ground. This negative voltage across resistor 17 holds the gate to cathode voltage of silicon-controlled rectifier 19 below the value required to turn on the silicon-controlled rectifier 19 so that this rectifier is inhibited during the time the charge current is flowing, thereby preventing the forward-biasing of transistor 10. In this way, the discharge path is not applied while either silicon-controlled rectifier 3 or 4 is conducting in order to prevent damage to either of these rectifiers 3 and 4 or the transformer 2 which might result from excessive current if the low resistance discharge path through transistor 10 were to be applied when either the silicon-controlled rectifier 3 or 4 is conducting.

The discharge path through transistor 10 is periodically applied in response to the attainment of a predetermined voltage between gate and cathode of silicon-controlled rectifier 19. As capacitor 18 charges, a portion of the voltage across the capacitor appears between the gate and cathode of the silicon-controlled rectifier 19 and when the voltage across the capacitor 18 attains a predetermined value the silicon-controlled rectifier 19 will be gated "on" to provide a low impedance path for the discharge of the capacitor 18 preparatory to again sensing the terminal voltage of the battery for the next application of the discharge path to the battery.

Upon the firing of silicon-controlled rectifier 19, a positive voltage appears at the base of transistor 10 with respect to the emitter thereof so that this transistor is turned on. This positive voltage is of sufficient magnitude with the discharging of capacitor 18 through silicon-controlled rectifier 19 and resistor 20 to place the transistor 10 in saturation. Transistor 10 remains in saturation for approximately 1 microsecond as determined by the time constant of the capacitor 18 and its discharge path.

The charging of the battery progresses with alternate charge intervals in which a series of direct-current pulses are applied to the battery and discharge intervals in which the discharge path is applied to the battery with the application of the discharge path becoming more frequent as the terminal voltage of the battery increases as charge progresses.

As set forth in detail in the above-mentioned applications, the terminal voltage of the battery being charged increases as charge progresses and because of the alternating charge intervals and discharge intervals, the temperature of the battery has only a negligible increase and the quiescent battery terminal voltage, i.e., the voltage while no charge current is flowing becomes an accurate indicator of the charge condition of the battery. It has been found that a battery comprised of five sub C sealed nickel-cadmium cells will have a terminal voltage of approximately 7.9 volts when the battery has a charge condition of approximately 100 percent of its rated capacity as rated by the manufacturer. The capacity to which the battery is charged for this terminal voltage of 7.9 volts may be slightly greater or slightly less than the rated capacity, depending upon the internal characteristics of the battery and the history of the battery.

The predetermined quiescent battery terminal voltage that represents the desired charge condition of the battery which will generally be the rated capacity or greater, is employed in the charger shown in the single FIGURE of the drawing in accordance with the present invention, to terminate the rapid charging of the battery.

The voltage divider of Zener diode 29, resistor 30 and potentiometer 31 is connected across the battery 1 and is responsive to the battery terminal voltage. The circuitry for terminating the rapid charge of the battery operates as follows:

When the voltage at the movable arm of potentiometer 31 with respect to ground reference has a sufficiently high positive value, the silicon-controlled rectifier 34 will be gated "on." With the gating "on" of the silicon-controlled rectifier 34 a low resistance path is provided between the gates of silicon-controlled rectifiers 3 and 4 to ground reference so that these silicon-controlled rectifiers will be inhibited and the low-impedance path for charge current through the silicon-controlled rectifiers 3 and 4 effectively removed. Thereafter, the only charge current applied to the battery 1 will be through the parallel path 26 which has a relatively high impedance compared to the impedances of silicon-controlled rectifiers 3 and 4 when they are conducting. Thus, the magnitude of the current would be decreased so that only a trickle charge will continue to flow. When the silicon-controlled rectifier 34 is gated "on" sustaining current is provided through resistor 32 which is connected to the positive terminal of the battery 1. This rapid charging terminating circuit is made responsive to the quiescent terminal voltage of the battery through the operation of transistor 40 and its bias circuit. The voltage across the secondary 5 of transformer 2 is applied to the diodes 22 and 23 so that a rectified alternating-current voltage appears at the anode of these diodes 22 and 23 which voltage is of opposite polarity and of the same phase as the direct-current pulses appearing at the cathodes of silicon-controlled rectifiers 3 and 4. A portion of the negative voltage with respect to ground at the anodes of diodes 22 and 23 appears at the base of transistor 40. The negative voltage on the base of transistor 40 forward-biases this transistor and renders it conductive so that it effectively bypasses potentiometer 31. The negative voltage applied to the base of transistor 40 is a pulsating voltage that returns to zero volts so that the transistor 40 shuts off. With the nonconduction of transistor 40 a higher voltage representative of the battery terminal voltage appears across potentiometer 31 and a portion thereof is applied to the gate of silicon-controlled rectifier 34. Transistor 40 is biased in its saturation condition for the majority of each negative pulse, which includes the time that charge current pulses are flowing to the battery. The conductivity of the transistor 40 decreases as the negative pulses approach zero and eventually turns off when the negative pulses reach zero. During this time increased voltage is applied between the gate and cathode of silicon-controlled rectifier 34 and if the battery terminal voltage has attained the predetermined value the silicon-controlled rectifier will be fired "on" to terminate the rapid charging of the battery.

Since the rapid charge termination circuit is operative only during the time that no charge current is flowing because of the operation of transistor 40, any voltage transient on the line cannot prematurely terminate the rapid charging.

Various changes may be made in the details of construction without departing from the spirit and scope of the invention as defined by the appended claims.

What is claimed is:

1. A rapid battery charging circuit comprising transmission means operable to transmit direct current pulses to a battery through a continuously operable electrical connection; a discharge path including an active element having a control terminal for applying the discharge path; and a discharge means for periodically electrically applying said discharge path across said battery without interrupting said electrical connection between said battery and said transmission means, said discharge means including a series voltage divider combination of four impedance elements connected across said battery; a capacitor connected across three of said impedance elements, with one side of the capacitor connected to the negative terminal of said battery; a series combination of a silicon-controlled rectifier and a resistor connected in parallel with said capacitor, with the resistor connected in the cathode circuit of the silicon-controlled rectifier; means for connecting the gate of the silicon-controlled rectifier to the middle junction of the four impedance elements; a source of voltage of opposite polarity and of the same phase as the direct current pulses applied to said battery, and means for connecting said source to the junction of the two impedance elements between the gate of said silicon-controlled rectifier and the terminal of the battery to which one side of the capacitor is connected; and means for connecting the cathode of said silicon-controlled rectifier to the control terminal of said active element.

2. A rapid battery charging circuit comprising first source means for supplying direct current pulses to a battery when the voltage level of said pulses exceeds the terminal voltage of said battery; a discharge path; means for developing a first battery function-responsive control signal; second source means for supplying a second control signal that opposes said first control signal at least during the time the voltage level of said pulses exceeds the terminal voltage of said battery, and circuit means responsive to said control signals for applying said discharge path across said battery.

3. The battery charging circuit of claim 2 wherein the first control signal-developing means includes capacitor means for integrating a current related to battery terminal voltage with respect to time.

4. The battery charging circuit of claim 2 including means operable in response to the attainment of a predetermined battery terminal voltage for reducing the current applied from said first source to said battery.

5. The battery charging circuit of claim 4 including circuit means responsive to said second source for initially inhibiting said reducing means during the time the voltage level of said pulses exceeds the terminal voltage of said battery.

6. A circuit for rapid charging a battery comprising:

a source of alternating current voltage;

a transformer having a primary connected to said source and a center-tapped secondary and a pair of controllable switches connected to opposite ends of said secondary and poled to provide fullwave rectification;

means for connecting the direct current pulses at the output of the switches to a battery to be charged;

means for periodically discharging said battery as charge progresses;

said discharging means operable in response to a battery function;

a path around at least one of said switches for providing trickle charge current to said battery;

means for inhibiting the pair of switches operable in response to the attainment of a predetermined battery voltage;

second fullwave rectification means connected to opposite ends of said secondary for producing a voltage of opposite polarity and of the same phase as the fullwave output from said controllable switches;

and means for coupling at least a portion of the voltage at the output of said second fullwave rectification means to said discharging means to make it inoperative while charge current is flowing through said pair of controllable switches.